United States Patent
Saint-Marcoux et al.

(10) Patent No.: US 10,252,625 B2
(45) Date of Patent: Apr. 9, 2019

(54) SYSTEM FOR MANAGING THE CHARGING OF A BATTERY AND THE REGENERATIVE BRAKING OF A VEHICLE AT LEAST PARTIALLY POWERED BY THE BATTERY AND ASSOCIATED REGULATION METHOD

(71) Applicant: RENAULT S.A.S., Boulogne-Billancourt (FR)

(72) Inventors: Antoine Saint-Marcoux, Palaiseau (FR); Do-Hieu Trinh, Fontenay le Fleury (FR); Yves Le Vourch, Le Chesnay (FR); Thomas Peuchant, Paris (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 470 days.

(21) Appl. No.: 14/413,119

(22) PCT Filed: Jul. 5, 2013

(86) PCT No.: PCT/FR2013/051614
§ 371 (c)(1),
(2) Date: Jan. 6, 2015

(87) PCT Pub. No.: WO2014/006348
PCT Pub. Date: Jan. 9, 2014

(65) Prior Publication Data
US 2015/0191092 A1 Jul. 9, 2015

(30) Foreign Application Priority Data
Jul. 6, 2012 (FR) ..................... 12 56497

(51) Int. Cl.
*H02J 7/00* (2006.01)
*B60L 11/18* (2006.01)
(Continued)

(52) U.S. Cl.
CPC .......... *B60L 11/1809* (2013.01); *B60W 10/26* (2013.01); *H02J 7/00* (2013.01);
(Continued)

(58) Field of Classification Search
CPC ....... B60L 11/1809; B60W 10/26; H02J 7/00; H02J 7/0047; H02J 7/0004; B60Y 2300/92
(Continued)

(56) References Cited

U.S. PATENT DOCUMENTS 6,870,336 B2 * 3/2005 Murakami ............... B60K 6/28
318/139
7,683,579 B2 3/2010 Kim et al.
(Continued)

FOREIGN PATENT DOCUMENTS

| | | |
|---|---|---|
| EP | 1 798 100 A2 | 6/2007 |
| FR | 2 912 265 A1 | 8/2008 |
| JP | WO 2011155186 A1 * 12/2011 ............ H01M 10/44 |

OTHER PUBLICATIONS

International Search Report dated Nov. 20, 2013 in PCT/FR2013/051614 filed Jul. 5, 2013.
(Continued)

*Primary Examiner* — Richard Isla
*Assistant Examiner* — Manuel Hernandez
(74) *Attorney, Agent, or Firm* — Oblon, McClelland, Maier & Neustadt, L.L.P.

(57) ABSTRACT

An electrical power supply system includes a battery of cells, the battery including an ammeter configured to measure battery current flowing through the battery, and at least one voltage sensor configured to measure voltage at terminals of a cell. An electronic control unit is configured to deliver a maximum permissible electrical power setpoint. The control unit is configured to calculate a maximum
(Continued)

permissible electrical power associated with a cell by taking the minimum of at least two values, including a first electrical power and a second electrical power.

15 Claims, 3 Drawing Sheets

(51) Int. Cl.
*B60W 10/26* (2006.01)
*H02J 7/14* (2006.01)
(52) U.S. Cl.
CPC .......... *H02J 7/0004* (2013.01); *H02J 7/0047* (2013.01); *B60Y 2300/92* (2013.01); *H02J 7/007* (2013.01); *H02J 7/14* (2013.01)
(58) Field of Classification Search
USPC .......................................... 320/109, 162–164
See application file for complete search history.

(56) References Cited

U.S. PATENT DOCUMENTS

| | | | | |
|---|---|---|---|---|
| 9,365,121 | B2* | 6/2016 | Kim | B60L 11/1809 |
| 2005/0035742 | A1* | 2/2005 | Koo | G01R 31/3624 |
| | | | | 320/149 |
| 2006/0087291 | A1* | 4/2006 | Yamauchi | B60L 11/1811 |
| | | | | 320/137 |
| 2007/0145953 | A1* | 6/2007 | Asai | G01R 31/3651 |
| | | | | 320/149 |
| 2007/0145954 | A1 | 6/2007 | Kawahara et al. | |
| 2009/0058366 | A1* | 3/2009 | Masuda | B60K 6/445 |
| | | | | 320/135 |
| 2009/0174369 | A1 | 7/2009 | Kawahara et al. | |
| 2009/0266631 | A1* | 10/2009 | Kikuchi | B60L 11/123 |
| | | | | 180/65.265 |
| 2009/0321163 | A1* | 12/2009 | Suzui | B60K 6/365 |
| | | | | 180/65.265 |
| 2010/0076647 | A1* | 3/2010 | Kamichi | B60L 11/14 |
| | | | | 701/36 |
| 2010/0079111 | A1* | 4/2010 | Masuda | H01M 10/486 |
| | | | | 320/134 |
| 2010/0090648 | A1 | 4/2010 | Jestin et al. | |
| 2013/0076314 | A1* | 3/2013 | Nagakura | H01M 10/44 |
| | | | | 320/162 |
| 2013/0241466 | A1* | 9/2013 | Mitsuda | H01M 10/441 |
| | | | | 320/103 |
| 2015/0108950 | A1* | 4/2015 | Yun | H02J 7/0068 |
| | | | | 320/134 |

OTHER PUBLICATIONS

French Preliminary Search Report dated May 7, 2013 in Patent Application No. FR 1256497 filed Jul. 6, 2012.

\* cited by examiner

SYSTEM FOR MANAGING THE CHARGING OF A BATTERY AND THE REGENERATIVE BRAKING OF A VEHICLE AT LEAST PARTIALLY POWERED BY THE BATTERY AND ASSOCIATED REGULATION METHOD

BACKGROUND

The subject of the invention is electrical battery management systems, and in particular the electrical battery management systems installed in and intended to propel a motor vehicle.

These batteries can be either recharged at electrical terminals when the vehicle is stopped, or recharged by recovering, through the electric motor, a portion of the kinetic energy of the vehicle when the latter decelerates. This is what is called regenerative braking.

It may be necessary to limit the power recovered and returned to the battery, for example so as not to compromise the operation of certain safety systems such as the ABS or ESP, as is described in the patent application WO 2008 040893.

It may also be necessary to limit the power returned to the battery in order not to damage the latter. Thresholds can then be imposed for the maximum current sent to the battery, or for the maximum voltage applied to the terminals of the battery.

Conventionally, a battery can be managed by an electronic control unit which monitors the maximum electrical power sent to the battery. This maximum electrical power can thus be linked to a maximum mechanical power authorized in recovery mode at the wheel level.

The limitations based only on the voltage threshold or only on a current intensity threshold do not make it possible to limit effects such as metal deposits in batteries of lithium ion type. Metallic lithium deposits can be produced at the negative electrode of the battery, in certain operating conditions in which the flow of Li+ ions arriving at the electrode is too great to allow the Li+ ions to be inserted into the graphite of the electrode. These Li+ ions then group together in the form of a metal deposit on the electrode, likely to create short circuits internal to the battery.

The patent application WO 2009 036444 proposes limiting this risk of lithium deposit by incorporating a reference electrode in each of the individual cells of the battery, and by monitoring the potential of the negative electrode relative to the reference electrode, so that it does not pass below a threshold potential of formation of the metallic lithium.

This solution is costly to apply because it assumes the insertion of reference electrodes in at least some of the cells of the battery. The system cost can become prohibitive if all the cells are equipped with a reference electrode, and may not be sufficiently reliable if only some of the cells are equipped.

BRIEF SUMMARY

The aim of the invention is to propose a system for managing the recharging phases of the battery, notably during regenerative braking phases, which makes it possible in particular to limit the risks of lithium deposits in a reliable and inexpensive manner.

To this end, the invention proposes an electrical power supply system, notably for a motor vehicle, comprising an electrical accumulation battery, the battery being made up of one or more cells, the battery being equipped with an ammeter suitable for measuring the battery current passing through the battery, and at least one voltmeter suitable for measuring the voltage at the terminals of a cell, the power supply system comprising an electronic control unit suitable for delivering a maximum exceptable electrical power setpoint during a battery recharging phase. The control unit is configured to compute a maximum exceptable power associated with a cell equipped with a voltmeter, by requiring the cell to remain below a maximum voltage between the terminals of the cell, this voltage being a decreasing function of the intensity passing through the cell.

The invention further proposes an electrical power supply system, notably for a motor vehicle, comprising an electrical accumulation battery. The battery is made up of one or more cells, is equipped with an ammeter suitable for measuring the current passing through the battery, and is equipped with at least one voltage sensor suitable for measuring the voltage at the terminals of a cell. According to an advantageous variant embodiment, each cell of the battery is equipped with a voltage sensor suitable for measuring the voltage at the terminals of the cell. Several cells connected in parallel can be equipped with one and the same voltage sensor. According to a preferential embodiment, the voltage at the terminals of the cell corresponds to the voltage at the terminals of an individual electrochemical cell, that is to say to the difference in potentials of two electrodes of the cell. The voltmeter can, for example, be connected to the terminals of an electrochemical cell, or of a group of several electrochemical cells connected in parallel to one another. The power supply system comprises an electronic control unit suitable for delivering a maximum exceptable electrical power setpoint during a battery recharging phase. The control unit is configured to compute a maximum exceptable power associated with a cell equipped with a voltmeter, by taking the minimum of at least two values, namely a second power and a first power, the second power being the product of a first constant threshold voltage by the sum of the battery current and of a term which is a function of the voltage at the terminals of the cell, and the first power being the product of a first function, linear relative to the battery current and relative to the voltage at the terminals of the cell, and of a second function, also linear relative to the battery current and relative to the voltage at the terminals of the cell. According to a preferred embodiment, the electronic control unit is configured to compute the minimum of the second power and of the first power for each of the cells equipped with a voltmeter. According to a particularly advantageous embodiment, the electronic control unit is configured to compute the minimum of the second power and of the first power for each of the cells of the battery.

The electronic control unit can comprise a state-of-charge computer, suitable for computing a state of charge of the cell, and can comprise a mapping that makes it possible to read, from a temperature and from the state of charge of the cell, an internal resistance of the cell. The term that is added to the battery current for the computation of the second power is then inversely proportional to the internal resistance of the cell, and the coefficients of the first and of the second linear functions are a function of the internal resistance of the cell. According to a preferred embodiment, the coefficients of the first and of the second linear function are computed in the form of fractions involving the internal resistance of the cell.

According to a particularly advantageous embodiment, the control unit is also suitable for imposing on the battery a power which is the minimum out of:
 the power desired by the driver,
 the power authorized by the battery, so as to allow for a limiting of the power at each instant as a function of the limits of the battery.

According to another embodiment which can be combined with the above, it is possible to compute, at each instant, an instantaneous resistance of the cell $r^i_{Short\_term\_cell,k+1}$ in the following form:

$$r^i_{Short\_term\_cell,k+1} = \frac{V^i_{cell,k+1} - V^i_{cell,k}}{I_{bat,k+1} - I_{bat,k}}.$$

It will then be possible to compute a filtered resistance $r^i_{cell,k+1}$ of the cell for example as follows:

$$r^i_{cell,k+1} = \beta \cdot r^i_{Short\_term\_cell,k+1} + (1-\beta) \cdot r^i_{cell,k}$$

where $\beta$ is a constant filtering coefficient, for example $\beta=0.01$ and $r^i_{cell,0}$ is the value of the initial internal resistance, computed from a mapping.

It is in particular possible to decide to apply this digital filtering to the internal resistance value of the cell, if the conditions described below are met:
Variation as an absolute value of the current level between two iterations of the computation $|I_{bat,k+1}-I_{bat,k}|$ above a threshold.
Minimum temperature over all the modules above or equal to a threshold.
State of charge of the battery above a certain level.

The electronic control unit can thus comprise a second computer configured to compute the value of the internal resistance for each cell as a function of the history of the current passing through the battery and of the history of the voltage measured at the terminals of the cell.

Preferentially, the battery comprises a number of voltage sensors each suitable for measuring the voltage at the terminals of a different cell, and the electronic control unit is configured to compute a maximum power that is exceptable by the battery as a minimum between the maximum exceptable powers of each cell equipped with a voltmeter, multiplied by a constant cell coefficient. The value of the cell coefficient can depend on the number of cells of the battery and on the connection of the cells with one another within the battery. The cell coefficient can, for example, correspond to the total number of cells in the case where all the cells are mounted in series, or correspond to the number of cells multiplied by two in the case where the battery comprises a series assembly of groups of two individual cells mounted in parallel.

The second power is, for example, the product of the first constant threshold voltage by the sum of the battery current and of a quotient in which the difference between the first threshold voltage and the voltage at the terminals of the cell is divided by the internal resistance of the cell.

According to a preferential embodiment, the internal resistance value of the cell is replaced, for the computation of the second power, by a secured internal resistance value obtained by multiplying the resistance derived from the mapping by a safety coefficient strictly greater than 1.

The first power is, for example, the product:
of the inverse of the square of the sum of the internal resistance of the cell and of a constant positive slope factor;
of the battery current multiplied by the internal resistance of the cell, to which is added a second threshold voltage and from which is subtracted the voltage at the terminals of the cell;
of the second threshold voltage multiplied by the resistance of the cell, a term to which is added the voltage at the terminals of the cell multiplied by the slope factor and from which is subtracted the battery current multiplied by the internal resistance of the cell and multiplied by the slope factor.

The first threshold voltage, the second threshold voltage and the slope factor are constant values stored in the electronic control unit.

The internal resistance value of the cell can be replaced, for the computation of the first power, by a secured internal resistance value obtained by multiplying the resistance derived from the mapping by a second safety coefficient strictly greater than 1. According to a preferred embodiment, the safety coefficient is preferably between 1.3 and 1.6. Advantageously, the first and the second safety coefficients can be equal. According to another possible embodiment, the first and the second safety coefficients can be different, both greater than 1, and preferably less than or equal to 1.5.

Preferably, the battery is equipped with a number of temperature sensors, and the electronic control unit is configured to read the internal resistances of the different cells by using a temperature value which is a minimum value out of a number of temperatures obtained from different sensors. The electronic control unit can be configured to read the internal resistances of the different cells by using a temperature value which is a minimum value out of a plurality of temperatures obtained from different sensors and by using the state of charge ("SOC") of the cell. The temperature used can, for example, be the minimum of the temperatures measured by the different sensors, or be the minimum of the temperatures measured by a number of sensors located in proximity to the cell concerned.

According to an improved variant embodiment, the electronic control unit is configured to compute the maximum exceptable power associated with the cell, by taking the minimum of at least three values, namely the second power, the first power, and a third power, the third power being the product
of the inverse of the square of the sum of the internal resistance of the cell and of a second constant positive slope factor, different from the first slope factor;
of the battery current multiplied by the internal resistance of the cell, to which is added a third threshold voltage and from which is subtracted the voltage at the terminals of the cell;
of the third threshold voltage multiplied by the resistance of the cell of the battery, a term to which is added the voltage at the terminals of the cell multiplied by the second slope factor and from which is subtracted the battery current multiplied by the internal resistance of the cell and multiplied by the second slope factor.

According to another aspect, the invention proposes a method for regulating the recharging phases of an electrical battery, in which the electrical power sent to the battery in order to recharge it is limited, by computing a maximum power that is exceptable by the battery, as a multiple of a maximum exceptable power associated with a cell of the battery, the maximum power associated with the cell being computed by taking the minimum of at least two values, namely a second power and a first power, the second power corresponding to the power absorbed by the cell if its voltage is increased until it reaches a first constant threshold voltage, and the first power corresponding to the power absorbed by the cell if its voltage and the charging current of the battery are increased until they cross an intensity-voltage curve which is strictly decreasing as a function of the intensity passing through the battery.

Preferentially, an internal resistance value of the cell, which is read in a mapping as a function of a state of charge and of a temperature, first is used to compute the first and the first power.

Advantageously, the maximum power associated with a number of cells is computed, and the maximum power exceptable by the battery is computed as a multiple of the minimum of the maximum powers associated with the different cells.

BRIEF DESCRIPTION OF THE DRAWINGS

Other aims, features and advantages of the invention will become apparent on reading the following description, given purely as a nonlimiting example and with reference to the attached drawings in which.

DETAILED DESCRIPTION

Figure 1:
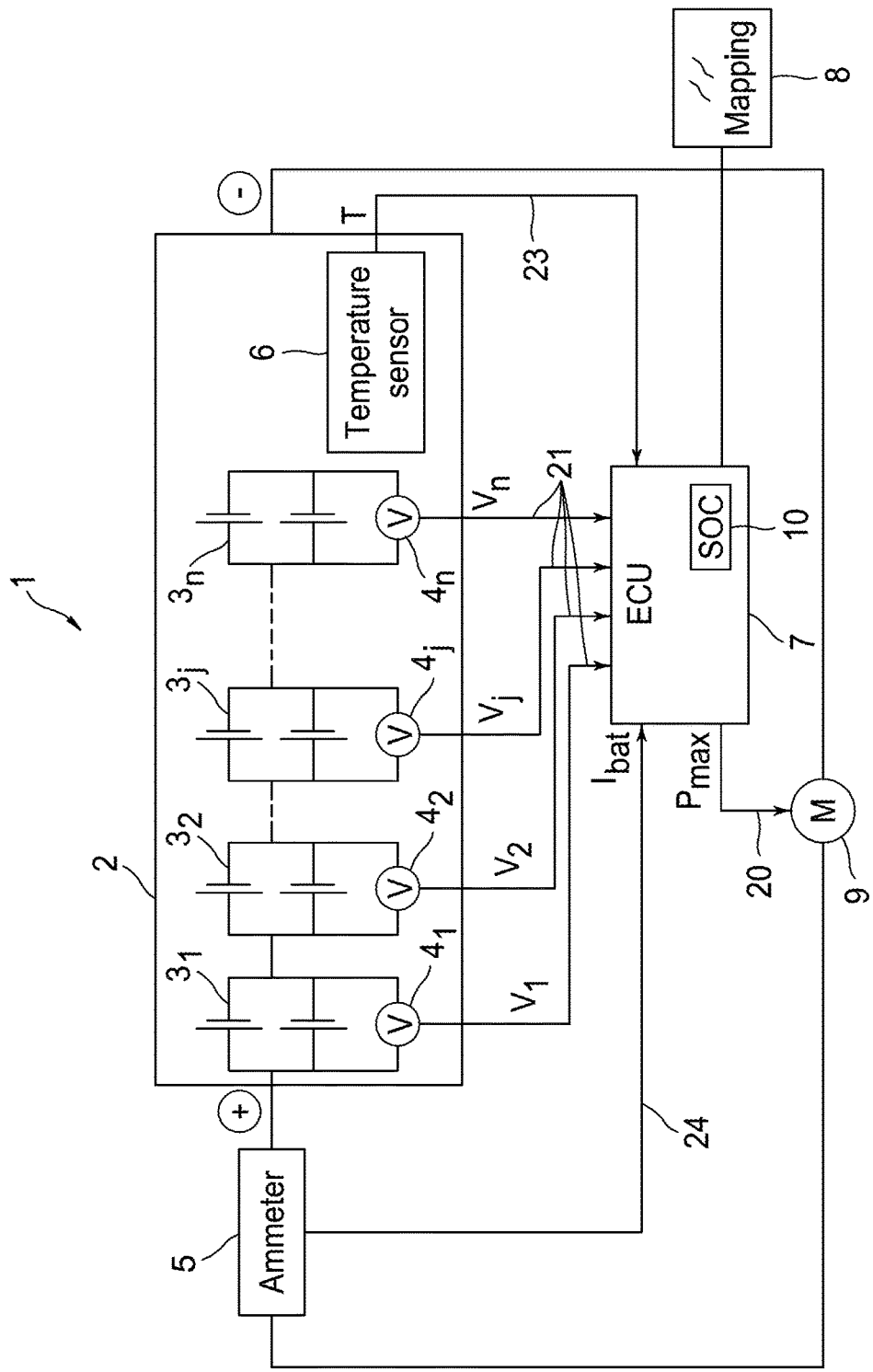
FIG. 1 represents an electric motor assembly according to the invention.

As illustrated in FIG. 1, an electric motor assembly 1 comprises a battery 2, an electric motor 9 and an electronic control unit 7. The battery is equipped with an ammeter 5 that makes it possible to measure the intensity of the current $I_{bat}(t)$ passing through the battery at an instant "t" and linked to the electronic control unit 7 by a connection 24. The battery is also equipped with one or more temperature sensors 6 that make it possible to measure a temperature T and linked to the electronic control unit 7 by a connection 23. The battery comprises cells $3_1, 3_2 \ldots 3_j \ldots 3_n$ mounted in series with one another and voltage sensors or voltmeters $4_1, 4_2 \ldots 4_j \ldots 4_n$ that make it possible to measure the voltage respectively $V_1(t), V_2(t) \ldots V_j(t) \ldots V_n(t)$, at the terminals of each cell $3_1, 3_2 \ldots 3_j \ldots 3_n$.

Each cell $3_1, 3_2 \ldots 3_j \ldots 3_n$ can be made up of several individual cells mounted in parallel, for example, in FIG. 1, made up of two individual cells mounted in parallel.

The electronic control unit 7 comprises a computer 10 suitable for computing the state of charge of each cell as a function for example of its history of temperature, current and voltage. The methods for computing the state of charge of a cell or of an accumulator battery are known. It is, for example, possible to use the method described in the paper "Extended Kalman filtering for battery management systems of LiPB-based HEV battery packs. Part 3. State and parameter estimation" (Gregory L Plett), Journal of power sources 134 pp 277-292. The electronic control unit 7 also comprises, or is linked to, a mapping 8 in which it is possible to read, as a function of a temperature and of a state of charge, an internal resistance value for each cell $3_1, 3_2 \ldots 3_j \ldots 3_n$.

The electronic control unit 7 delivers, via a connection 20, a value $P_{max}$ of maximum power authorized for the recharging of the battery.

For example, the value $P_{max}$ can be sent to a manager of the regenerative braking phases which, as soon as the power delivered by the motor 9 approaches the authorized threshold, completes the braking using the dissipative braking means of the vehicle (brake pads, disks).

Figure 2:
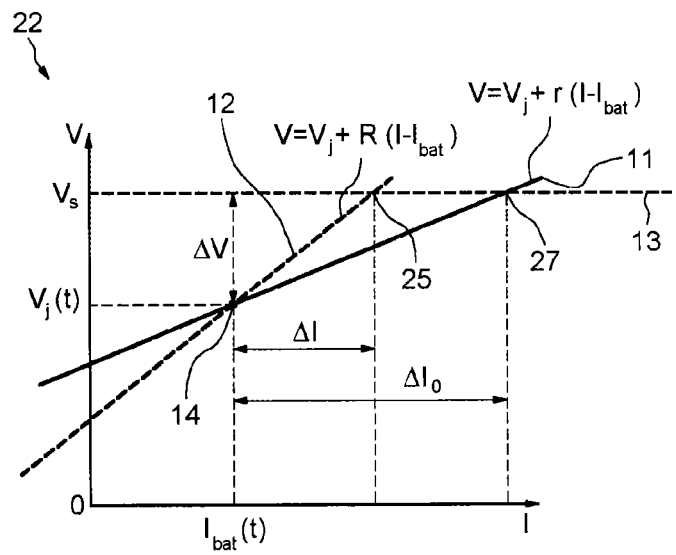
FIGS. 2 and 3 illustrate graphs of positioning of the operating point (current, voltage) of a battery belonging to the electric motor assembly of FIG. 1, relative to different monitoring criteria.

FIG. 2 illustrates the principle of the computation of an operating threshold point 25 that a cell $3_j$ is authorized to reach so as not to exceed a first damaging threshold, which is, here, a constant threshold voltage $V_s$.

There is thus found, in FIG. 2, a straight line 11 passing through the current operating point 14 ($I_{bat}(t), V_j(t)$) of the cell, and having for its slope the internal resistance r of the cell. To observe the voltage threshold $V_s$, the current $I_{bat}(t)$ and the voltage $V_j(t)$ can be increased to reach the operating point 27 where the straight line 11 meets the horizontal 13 associated with the threshold $V_s$. The voltage and current increments authorized are then respectively $\Delta V$ and $\Delta I_0$.

In order to take a safety margin and to take account of the computation uncertainties concerning the internal resistance r, it is preferable to take, as authorized limit operating point, a point 25 corresponding to the intersection of a straight line 12 passing through the operating point 14 and corresponding to an internal resistance R slightly greater than the mapped internal resistance r. The voltage and current increments authorized are then respectively $\Delta V$ and $\Delta I < \Delta I_0$.

It is, for example possible to choose R=k·r, k being a safety coefficient strictly greater than 1, and preferably less than or equal to 1.5.

The maximum power $P_{maxj1}$ acceptable by the cell j according to this first criterion is then equal to:

$$P_{maxj1} = V_s \left\{ I_{bat}(t) + \frac{V_s - V_j(t)}{R} \right\} \qquad \text{Equation (1)}$$

Figure 3:
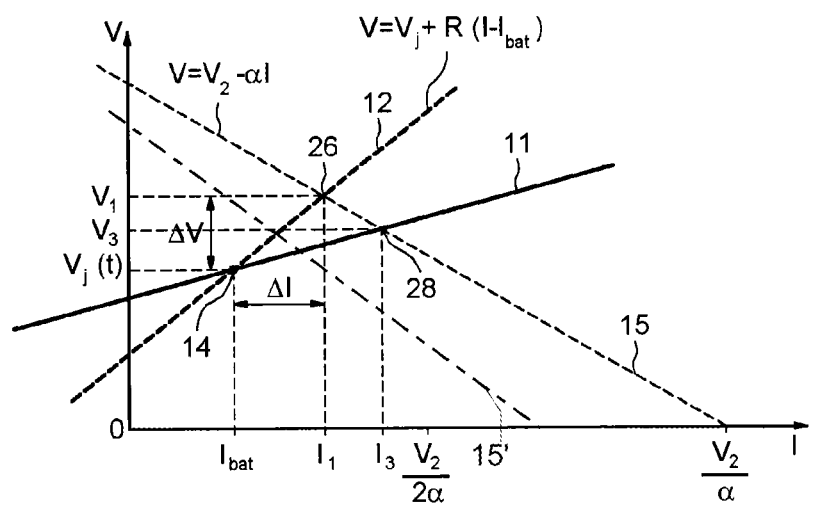

FIG. 3 illustrates the principle of the computation of another limit operating point, authorized this time to avoid the formation of metal deposits—generally in the form of lithium dendrites—on the negative electrode of the cell.

Not having the information concerning the negative electrode potential relative to a reference electrode, an operating threshold is set in the form of a continuously decreasing curve of voltage as a function of current, the threshold here being illustrated by a straight line 15 whose ordinate at the origin is a voltage $V_2$ and that has a negative slope of absolute value $\alpha$. The current and the voltage of the cell can then be increased from the current $I_{bat}(t)$ of the voltage $V_j(t)$ corresponding to the operating point 14, to a point 28 of coordinates ($I_3, V_3$), corresponding to the intersection of the threshold straight line 15, and of the straight line 11 whose slope is the internal resistance r of the cell. As in the case of FIG. 2, for safety, a point 26 of coordinates ($I_1, V_1$) corresponding to the intersection of the threshold straight line 15 with the straight line 12 corresponding to a straight line of operation "with uprated resistance R" of the cell $3_j$ is taken rather than the point 28. The voltage and current increments authorized are then respectively a new voltage increment $\Delta V$ and a new current intensity increment $\Delta I$, different from those of FIG. 2.

The coordinates ($I_1, V_1$) of the point of intersection 26 are obtained using the equations of the two straight lines 15 and 12, according to the following equations:

$$V_2 - \alpha I_1 = V_j(t) + R(I_1 - I_{bat}(t)) \qquad \text{Equation (2)}$$

$$(R + \alpha)I_1 = V_2 - V_j(t) + RI_{bat}(t) \qquad \text{Equation (3)}$$

$$I_1 = \frac{V_2 - V_j(t) + RI_{bat}(t)}{R + \alpha} \quad \text{Equation (4)}$$

$$V_1 = V_2 - \alpha I_1 = \frac{(R+\alpha)V_2 - \alpha V_2 + \alpha V_j(t) - R\alpha I_{bat}(t)}{R + \alpha} \quad \text{Equation (4)}$$

$$V_1 = \frac{RV_2 + \alpha V_j(t) - R\alpha I_{bat}(t)}{R + \alpha} \quad \text{Equation (5)}$$

$$P_{maxj2} = I_1 \times V_1 \quad \text{Equation (6)}$$

$$= \frac{1}{(R+\alpha)^2}\binom{V_2 - V_j(t) +}{RI_{bat}(t)}\binom{(R+\alpha)V_2 - \alpha V_2 +}{\alpha V_j(t) - R\alpha I_{bat}(t)}$$

The power $P_{maxj2}$ corresponding to the point of intersection 26 is lower than a power $P'_{maxj2}$ corresponding to the point of intersection 28, notably if the intensity $I_2$ is less than $V_2/2\alpha$. In this case, the choice of using an overrated resistance R relative to the mapped resistance r is an added safety measure. Such is the case with the usual values, for example $V_2$ of the order of 4V, $\alpha$ of the order of 0.0025 Volt·A$^{-1}$ and a maximum battery current value of the order of 60 A. Broadly, $I_{bat}$<60 A<$V_2/2\alpha$=800 A then applies.

When the threshold curve delimiting the range in which the battery can be used without generating any lithium deposit is a nonlinear function, this function can be approximated by several straight line portions 15 defined by different abscissa at the origin $V_2$, and different slopes a. The maximum power authorized for the cell is then computed, corresponding to the intersection of the straight line 12 with each of the duly defined threshold straight lines, and the minimum of these different powers and of the power $P_{maxj1}$ are taken.

Figure 4:
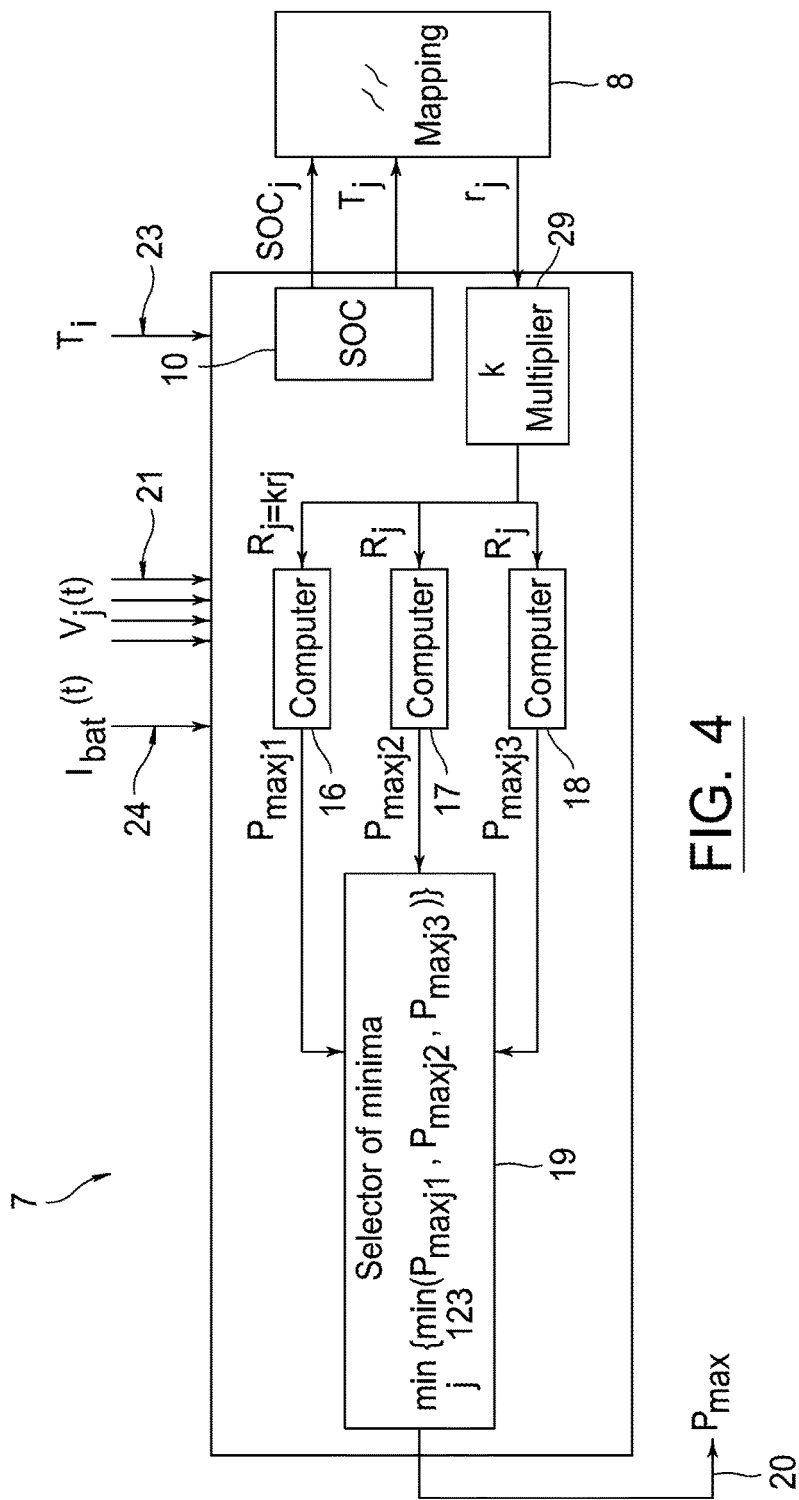
FIG. 4 illustrates certain aspects of the operation of an electric control unit belonging to the electric motor assembly of FIG. 1.

FIG. 4 illustrates a part of the operation of the electronic control unit 7 that makes it possible to deliver the maximum power value $P_{max}$ authorized for the recharging of the battery 2 of FIG. 1.

The electronic control unit 7 receives as input the battery current $I_{bat}(t)$ measured by the ammeter 5, the different voltages $V_j(t)$ delivered by the different voltmeters $4_1$, $4_2$, $4_j$, $4_n$ associated with the cells $3_1$, $3_2$, $3_j$, $3_n$.

The electronic control unit 7 receives one or more temperature values $T_i$ via connections 23 corresponding to temperatures at different points of the battery. The state-of-charge computer 10 computes, for each of the cells $3_1$, $3_2$, $3_j$, $3_n$, its state of charge $SOC_j$, sends this value to the mapping 8 associated with a temperature $T_j$ computed from the temperatures $T_i$, to correspond with a temperature closer to the cell and/or correspond to a minimum temperature estimated in the vicinity of the cell. Based on these two data, the electronic control unit 7 reads, in the mapping 8, a value $r_j$ corresponding to an estimated internal resistance of the cell $3_j$. It sends this value $r_j$, to a multiplier 29 which multiplies the resistance $r_j$, by a safety coefficient k to obtain an uprated resistance $R_j$. The uprated resistance $R_j$ is then sent by the electronic control unit to a first, a second, and a third maximum authorized power computer, respectively identified by the references 16, 17 and 18.

The computer 16 computes the maximum authorized power for the cell j in order to not exceed the voltage threshold $V_s$ as explained in the description of FIG. 2.

The computer 17 computes a maximum authorized power for the cell $3_j$ so that the latter does not give rise to a deposit of dendrite on the basis of a threshold curve corresponding to the straight line 15 illustrated in FIG. 3.

The third computer 18 computes a maximum authorized power for the cell $3_j$, computed according to the same principle as the maximum authorized power $P_{maxj2}$, but associated with a straight line 15' of different equation from the straight line 15 illustrated in FIG. 3.

The three values $P_{maxj1}$, $P_{maxj2}$, $P_{maxj3}$, for each value of j between 1 and n, are sent to a selector of minima 19, which selects the minimum value of the 3×n duly computed power values.

This minimum value corresponds to the lowest power that one of the cells of the battery 2 is capable of accepting, while satisfying the three criteria corresponding to the threshold straight line 13, to a first threshold straight line 15, and to a second threshold straight line 15' of slope different from the first threshold straight line 15, and of abscissa at the origin different from the first threshold straight line 15. The maximum power value accepted by the battery can then be deduced from the minimum power out of the 3n values computed previously, by multiplying this minimum value by the number n of cells.

By using the method according to the invention, it is thus possible to reliably estimate the maximum power that can be sent to the battery without causing any premature degradation thereof. The method according to the invention can be used to take into account ranges of operation limited by a straight line or a group of straight lines other than the straight lines associated with metallic lithium deposit formation thresholds, in place of, or in addition to, the straight lines of metallic lithium deposit formation thresholds.

The invention is not limited to the exemplary embodiments described and can be made available in numerous variants. The battery could be equipped with just one temperature sensor, each cell could be equipped with a temperature sensor, or the battery could be equipped with a number of temperature sensors less than the number of cells. In the latter case, the temperature retained for the computation of the internal resistance of the battery can correspond either to a minimum temperature over all the sensors, or to a local minimum temperature on the sensors closest to the cell concerned, or to an estimated temperature of the cell core from other temperature measurements. Other choices of the arbitrations between the different temperature values are also possible. In one version it is possible to compute only an overall state of charge for battery, and assign the same internal cell resistance value to each of the cells, from this average state of charge.

The limitation of the power sent to the battery according to the invention can be implemented during all the battery recharging phases, or can be implemented selectively for certain battery recharging phases, for example during the regenerative braking phases.

The maximum power computers 17 and 18 can be replaced by a maximum power computer suitable for directly determining the intersection of the operating straight line 12 with a nonlinear curve delimiting the authorized range of operation of the battery without the formation of dendrites.

The safety coefficient k can be different for the computation of the power $P_{maxj1}$, and for the computation of the maximum powers $P_{maxj2}$ and $P_{maxj3}$.

The battery could be made up of cells in series each made up of a single individual cell or, on the contrary, made up of at least two individual cells in parallel. They can of course be individual cells of lithium-ion type, but they can also be cells based on another chemistry.

The invention claimed is:

1. A method for regulating a recharging phase of an electrical battery, comprising:
limiting electrical power sent to the battery to recharge the battery during the recharging phase by computing a maximum power that is acceptable by the battery as a multiple of a maximum acceptable power associated with a selected cell of the battery,
the maximum acceptable power associated with the selected cell being computed by taking a minimum of at least three values, including a first power, a second power, and a third power,
wherein the first power is calculated such that the selected cell does not exceed a constant threshold voltage,
wherein the second power is calculated such that metal deposits are not formed on a negative electrode of the selected cell based on a first operating threshold, and
wherein the third power is calculated such that the metal deposits are not formed on the negative electrode of the selected cell based on a second operating threshold that is different than the first operating threshold.

2. The regulation method as claimed in claim 1, wherein, an internal resistance value of the selected cell, which is read in a mapping as a function of a state of charge and of a temperature, is used to compute the first and the second powers.

3. The method as claimed in claim 2, wherein the battery includes a number of cells, including the selected cell, and the maximum acceptable power associated with each cell of the number of cells is computed, and a maximum power acceptable by the battery is computed by multiplying a minimum of the maximum acceptable power associated with each cell by the number of cells.

4. An electrical power supply system for a motor vehicle, comprising:
an electrical accumulation battery, the battery including one or more cells, the battery including an ammeter configured to measure current passing through the battery, and at least one voltmeter, each voltmeter of the at least one voltmeter being configured to measure voltage at terminals of a corresponding cell of the one or more cells;
an electronic control unit configured to deliver a maximum power that can be accepted by the battery during a recharging phase,
wherein the control unit is configured to compute a maximum power that can be accepted by a selected cell of the one or more cells, the maximum power that can be accepted by the battery being a multiple of the maximum power that can be accepted by the selected cell,
wherein the control unit computes the maximum power that can be accepted by the selected cell by taking a minimum of at least three values, including a first power, a second power, and a third power,
wherein the first power is calculated by the control unit such that the selected cell does not exceed a constant threshold voltage,
wherein the second power is calculated by the control unit such that metal deposits are not formed on a negative electrode of the selected cell based on a first operating threshold, and
wherein the third power is calculated by the control unit such that the metal deposits are not formed on the negative electrode of the selected cell based on a second operating threshold that is different than the first operating threshold.

5. The electrical power supply system as claimed in claim 4, wherein the first power is a product of a first linear function relative to the battery current and relative to the voltage at the terminals of the selected cell, and a second linear function relative to the battery current and relative to the voltage at the terminals of the selected cell.

6. The electrical power supply system as claimed in claim 5, wherein the second power is the product of a first constant threshold voltage by the sum of the battery current and of a term which is a function of the voltage at the terminals of the selected cell.

7. The power supply system as claimed in claim 5, wherein the control unit comprises a state-of-charge computer configured to compute a state of charge of the selected cell, and comprises a mapping that makes it possible to read, from a temperature and from the state of charge of the selected cell, an internal resistance of the selected cell, a term being added to the battery current for computation of the first power being inversely proportional to the internal resistance of the selected cell, and coefficients of the first and of the second linear function being functions of the internal resistance of the selected cell.

8. The power supply system as claimed in claim 7, wherein the second power is the product of a first constant threshold voltage by the sum of the battery current and of a quotient in which the difference between the first threshold voltage and the voltage at the terminals of the selected cell is divided by the internal resistance of the selected cell.

9. The power supply system as claimed in claim 8, wherein a value of the internal resistance of the selected cell is replaced, for the computation of the first power, by a secured internal resistance value obtained by multiplying the resistance derived from the mapping by a safety coefficient strictly greater than 1.

10. The power supply system as claimed in claim 7, wherein the first power is the product:
of the inverse of the square of the sum of the internal resistance of the selected cell and of a constant positive slope factor;
of the battery current multiplied by the internal resistance of the selected cell, to which is added a second threshold voltage and from which is subtracted the voltage at the terminals of the selected cell;
of the second threshold voltage multiplied by the resistance of the selected cell, a term to which is added the voltage at the terminals of the selected cell multiplied by the slope factor and from which is subtracted the battery current multiplied by the internal resistance of the selected cell and multiplied by the slope factor.

11. The power supply system as claimed in claim 10, wherein the internal resistance value of the selected cell is replaced, for the computation of the first power, by a secured internal resistance value obtained by multiplying the resistance derived from the mapping by a second safety coefficient strictly greater than 1.

12. The power supply system as claimed in claim 11, wherein the third power is the product of the following three terms:
the inverse of the square of the sum of the internal resistance of the selected cell and of a second constant positive slope factor, different from the first slope factor;
the battery current multiplied by the internal resistance of the selected cell, to which is added a third threshold voltage and from which is subtracted the voltage at the terminals of the selected cell;

the third threshold voltage multiplied by the resistance of the selected cell, a term to which is added the voltage at the terminals of the selected cell multiplied by the second slope factor and from which is subtracted the battery current multiplied by the internal resistance of the selected cell and multiplied by the second slope factor.

13. The power supply system as claimed in claim 7, wherein the battery includes a number of temperature sensors, and wherein the electronic control unit is configured to read internal resistances of different cells of the one or more cells by using a temperature value which is a minimum value out of a plurality of temperatures obtained from different sensors.

14. The power supply system as claimed in claim 7, wherein the electronic control unit further comprises a second computer configured to compute the value of the internal resistance for each cell of the at least one cell as a function of the history of the current passing through the battery and of the history of the voltage measured at the terminals of each cell.

15. An electrical power supply system for a motor vehicle, comprising:
   an electrical accumulation battery, the battery including one or more cells, the battery including an ammeter configured to measure current passing through the battery, and at least one voltmeter, each voltmeter of the at least one voltmeter being configured to measure voltage at terminals of a corresponding cell of the one or more cells;
   an electronic control unit configured to deliver a maximum power that can be accepted by the battery during a recharging phase,
   wherein the control unit is configured to compute a maximum power that can be accepted by a selected cell of the one or more cells, the maximum power that can be accepted by the battery being a multiple of the maximum power that can be accepted by the selected cell,
   wherein the control unit computes the maximum power that can be accepted by the selected cell by taking a minimum of at least three values, including a first power, a second power, and a third power,
   wherein the first power is calculated by the control unit as a product of a first linear function relative to the battery current and relative to the voltage at the terminals of the selected cell, and a second linear function relative to the battery current and relative to the voltage at the terminals of the selected cell,
   wherein the second power is calculated by the control unit as product of a first constant threshold voltage by the sum of the battery current and of a term which is a function of the voltage at the terminals of the selected cell, and
   wherein the third power is calculated by the control unit as a product of the following three terms:
      the inverse of the square of the sum of the internal resistance of the selected cell and of a second constant positive slope factor;
      the battery current multiplied by the internal resistance of the selected cell, to which is added a third threshold voltage and from which is subtracted the voltage at the terminals of the selected cell;
      the third threshold voltage multiplied by the resistance of the selected cell, a term to which is added the voltage at the terminals of the selected cell multiplied by the second slope factor and from which is subtracted the battery current multiplied by the internal resistance of the selected cell and multiplied by the second slope factor.

* * * * *